United States Patent [19]

Gerling et al.

[11] 4,326,114
[45] Apr. 20, 1982

[54] APPARATUS FOR MICROWAVE ROASTING OF COFFEE BEANS

[75] Inventors: John E. Gerling, Cupertino; John P. O'Meara, Orinda, both of Calif.

[73] Assignee: Gerling-Moore, Inc., Santa Clara, Calif.

[21] Appl. No.: 196,388

[22] Filed: Oct. 14, 1980

Related U.S. Application Data

[62] Division of Ser. No. 968,012, Dec. 11, 1978, abandoned.

[51] Int. Cl.³ .............................................. H05B 6/78
[52] U.S. Cl. ...................... 219/10.55 A; 219/10.55 R; 219/10.55 D; 426/242; 426/466; 99/451
[58] Field of Search ................ 219/10.55 A, 10.55 R, 219/10.55 M, 10.55 B, 10.55 D; 426/241, 242, 243, 466, 467, 468, 469; 99/451, DIG. 14

[56] References Cited

U.S. PATENT DOCUMENTS

| | | | |
|---|---|---|---|
| 2,159,027 | 5/1939 | Jalma et al. | 426/523 |
| 2,443,620 | 6/1948 | Hubbard | 426/242 |
| 2,464,421 | 3/1949 | Torres | 426/242 |
| 3,222,491 | 12/1965 | Schmid et al. | 219/10.65 |
| 3,345,180 | 10/1967 | Smith, Jr. | 426/314 |
| 3,345,181 | 10/1967 | Smith, Jr. | 426/314 |
| 3,626,838 | 12/1971 | Gorakhpurwalla | 426/243 |
| 3,746,822 | 7/1973 | Le Viet | 219/10.55 A |
| 3,889,009 | 6/1975 | Lipoma | 219/10.55 A |
| 3,916,137 | 10/1975 | Jurgensen | 219/10.55 A |
| 3,983,356 | 9/1976 | Jurgensen | 219/10.55 A |
| 4,129,768 | 12/1978 | Anderson | 219/10.55 M |
| 4,180,718 | 12/1979 | Hanson | 219/10.55 R |

OTHER PUBLICATIONS

Hamid et al., Journal of Microwave Power, "Microwave Bean Roaster", pp. 109–112, 1975.
Sivetz et al., *Coffee Processing Technology,* "Green Coffee Processing at the Roasting Plant", pp. 220–226, 1963.

Primary Examiner—B. A. Reynolds
Assistant Examiner—Philip H. Leung
Attorney, Agent, or Firm—Flehr, Hohbach, Test

[57] ABSTRACT

A microwave oven is incorporated in a coffee bean roasting system and includes a rotatable microwave transparent tube or drum positioned within the same and at an angle to the horizontal, through which coffee beans are introduced at an upper end and flow in continuous agitation to the lower end while being subjected to microwave fields within the oven. At the lower end of the oven a separate section is preferably provided for subjecting the coffee beans to selective treatment during the final stages of the roasting process. In one form utilizing a unitary structure the separate section is provided by a conductive septum which separates the oven into sections in which the power level is different. In the last section the power level is adjusted to control the final critical phase of the roasting process. The oven terminates into a cooling and quenching chamber from which the beans are delivered through a microwave trap to a further cooling stage to rapidly reduce their temperature to well below roasting.

7 Claims, 3 Drawing Figures

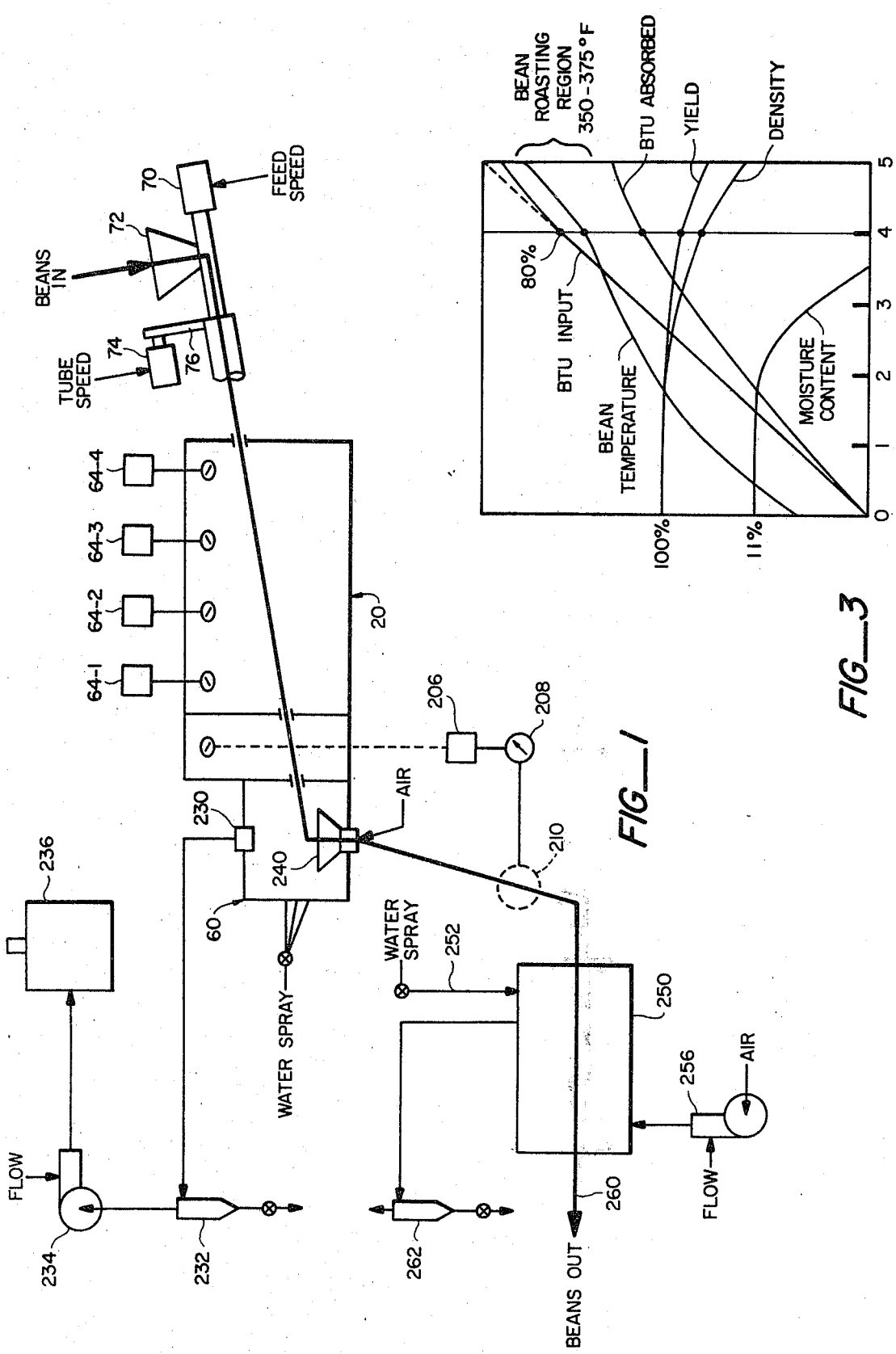
FIG_1
FIG_3

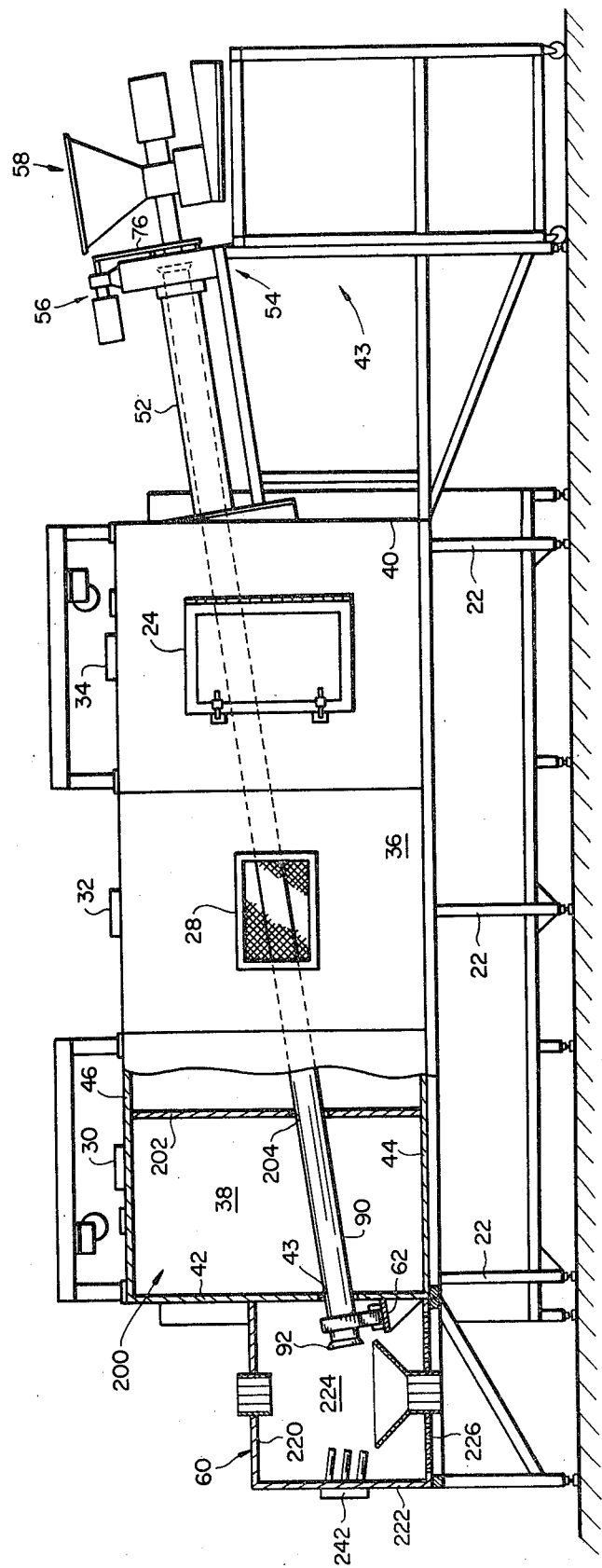
FIG_2

APPARATUS FOR MICROWAVE ROASTING OF COFFEE BEANS

This is a division of application Ser. No. 968,012 filed Dec. 11, 1978, now abandoned.

BACKGROUND OF THE INVENTION

This invention relates to coffee bean roasting and more particularly to method and apparatus for the continuous roasting of coffee by microwave energy.

Roasting of coffee involves several steps, the first of which involves raising the temperature of the coffee bean to a level at which the residual internal moisture begins to be driven off. After having reached this level the coffee bean temperature rises more slowly until dry. Thereafter the bean elevates in temperature until it reaches approximately 350°–375° F. and roasting begins in which the beans undergo certain chemical and physical changes. More specifically, roasting involves the thermal decomposition of sugars such as sucrose, along with chemical interactions between the sugars, proteins and more complex carbohydrates to produce a variety or organic acids, aldehydes, ketones and the like which give roasted coffee its characteristic flavor and aroma. The coffee bean is also expanded during the final stages of roasting, and when the beans are ground after roasting, the essential contents are easily water extracted. During the period in which the coffee bean is raised in temperature to that which is necessary to evaporate the moisture and beyond to the temperature at which roasting takes place, the bean is endothermic. As roasting proceeds to the point where the sugars begin to decompose, the coffee bean becomes exothermic, and, if the beans become overheated they are subject to thermal runaway and burn, and may even flame. Without elaborating unduly, many coffee roasting procedures and associated apparatus have been proposed. One typical and common roaster, known as the Thermalo brand, manufactured by Jabez Burns Division of Blaw-Knox Food and Chemical Equipment, Inc. of Buffalo, New York, has been widely adopted, particularly in the United States. It is illustrative of present common commercial practice. One form of this apparatus is designed for continuous processing and is based upon the principle of burning a gas or fuel oil so as to create a high velocity stream of extremely hot gases having a temperature of the order of 800° F. These gases are passed through a continuous roaster having a rotating perforated cylinder with an internal helical baffle which serves as a feed and advancng mechanism for the beans as the cylinder rotates about a horizontal axis. Hot gases passing through the cylinder wall perforations are sufficiently forceful and turbulent to stir through the beans and generally provide the convective heat transfer for the roasting process. Thus, this type of conventional roasting subjects the beans to high velocity hot air by the direct combustion with natural gas or fuel. When these gases leave the roaster after the last contact with the roasted beans, their temperature is typically 425° F. often regarded as an approximate roastng temperature. By using this sysem, the hot air contacting the beans ultimately raises the surface temperature of the bean considerably higher than necessary for proper bean roast and causes greater thermal decomposition to take place at the surface of the bean than is necessary or desirable. This appears to be an unavoidable result of any system in which convective or conductive heating of the bean surface is relied upon to get a sufficient interior temperature to obtain a properly roasted bean throughout its cross-section. Thus, overroasting occurring at the surface of the bean in conventional systems and part way into the bean results in a greater weight loss than necessary compared to a bean heated uniformly to roasting temperature. In addition to the accompanying weight loss is also some loss of desirable flavor components and results in roasting process offgases containing considerable amounts of decomposition products, smoke, tars and so forth, all of which represent major pollution control problems. Another causing lowering the yield in conventional roasting results from the use of a large excess of hot air conducted past the beans at high velocity (for efficiency). This results in removal of many fine and small particles of the roasted bean that could otherwise be a useful part of a conventional grind and contribute to the final product. However, these materials are usually non-recoverable, being taken up the exhaust stack and if recirculated back through the burner, they are consumed.

Several alternate proposals have been made to utilize different systems; however, they have not met with significant commercial success for several reasons. Reference is made to the book *Coffee Processing Technology*, Vol. I, by Michael Sivertz and H. Elliott Foote, published by A.V.I. Publishing, Inc. of Westport, Connecticut, 1963, at about pages 216 and following where several alternate systems are discussed. As previously mentioned, any system requiring external means for conduction or convection heating of the bean by a gas or liquid from the surface will inherently possess many of the foregoing disadvantages. Infrared and dielectric roasting of coffee is known but as reviewed in the referenced text, they have not been particularly successful. As noted on page 220 of the text, microwave heating for the purpose of roasting coffee has been proposed and is there reviewed on a laboratory experiment scale where it is found that the selectively roasted coffees form electric coronas of ionized gases. The conclusion drawn is that one cannot expect microwave energy to be useful for this purpose.

Microwave roasting has also been attempted to be used in conventional microwave ovens. However, the nonuniformity of fields within such ovens, even where movement of the beans is accomplished by rotating tray equipment, has also been unsuccessful due to lack of bean to bean contact enabling heat redistribution. In addition, this difficulty does not appear to be solvable in conventional continuous belt microwave equipment for similar reasons, namely, selective over roasting, burning and flaming of certain beans while others are under roasted. It should be noted that the foregoing problems result from the inherent character of coffee beans in that a statistical distribution of moisture content, oil content, sugar content, and other factors is sufficiently wide that it cannot be expected to achieve a uniform roast in which individual beans are subjected to substantially individualized treatment whether uniform or not. Nevertheless, it would be desirable to provide a microwave coffee bean roasting system since it is capable of inherently heating and roasting the bean uniformly across its cross-section and to avoid bean surface over roasting. There is, therefore, a general need for a microwave system for the roasting of coffee beans which will overcome the foregoing limitations and disadvantages of conventional roasting hot air systems, dielectric systems, and previous attempts at microwave roasting.

SUMMARY OF THE INVENTION AND OBJECTS

It is a general object of the present invention to provide a unique and novel microwave coffee bean roasting apparatus and method which will overcome the above limitations and disadvantages.

It is a further object of the invention to provide a microwave bean roasting system in which the beans are progressively heated in a conveying mechanism with microwave energy while being tumbled and continuously brought into a direct thermal contact with each other and to achieve this in such a way that nonuniformity of heating of the beans due to their varying character is substantially eliminated.

It is a further object of the invention to provide a system of the above character in which control of the roasting segment of the process is under precise and variable control distinct from the earlier heating portions of the process.

It is a further object of the invention to provide a microwave coffee bean roasting system of the above character in which roasting yield is increased because of reduction of thermal decomposition and decreased loss of particulates and further in which the taste and aroma of the resulted roasted coffee can be improved by roasting the same in a nonoxidizing atmosphere without recirculation of volatiles given off during the roasting process.

A further object of the invention is to provide a coffee roasting system which is independent of direct use of petroleum based fuels or natural gas, the products of which are exposed to the coffee beans during the roasting process.

These and other features and objects of the invention will become apparent from the following summary thereof and the further detailed description to be given, after which the various advantages and features of the system of this invention will be summarized and more easily understood.

To facilitate understanding of the present invention, reference is made to the cross referenced application, Ser. No. 757,602 now U.S. Pat. No. 4,129,768 of Eldon E. Anderson. That application discloses a rotary tube microwave processor which was originally developed for the devulcanization of rubber particles. The present invention is predicated on the realization that such apparatus can be used for and into a system for the roasting of coffee. Both coffee and rubber particles possess one similar characteristic in that during the final heatng phase they become subject to thermal runaway. However, that apparatus is not ideally suited to carrying out the method of the present invention, particularly in relation to controlling the roasting period and providing rapid cooling which is a specific requirement in the roasting of coffee. However, the general characteristics of the rotary tube mirowave processor are found generically applicable for adaptation in such a way as to provide the features desirable for coffee roasting. Thus, the present invention is an adaptation of the apparatus disclosed and described in that application and incorporates therefrom its most useful and desirable features and basic mode of construction and operation. Accordingly, insofar as the disclosure and description herein duplicates common features, the same will be given in abbreviated form with more specific reference to constructional features being set forth in said application.

In general, the present invention is based on the realization that it is possible to provide a system based on using a rotary tube microwave processor such as is disclosed in the cross referenced application suitably modified to control the roasting time and temperature of the roasted beans as they emerge from the microwave heating portion of the system and to thereat immediately cool the beans in a first cooling chamber to a temperature below roasting. Simultaneously, the volatiles given off by the beans in the roasting process can be contained within a cooling chamber and carried off in a stream of cooling air for chaff removal and pollution control. More specifically, the system of the present invention utilizes a microwave oven through which a microwave transparent tube extends and is adapted for rotation. The tube is inclined at an angle so that the beans will flow therethrough as the same is rotated. A suitable bean feeding mechanism is located at the upper end of the tube which meters the flow through the tube. Suitable mechanisms control the feed rate and speed of rotation of the tube. As the beans flow downward they lose moisture which assists in causing them to aglomerate slightly and thus attain a tumbling action and agitation down through the tube as they are progressively heated. After the moisture is removed the beans continue to be heated to the roasting temperature at which point the oils exuded by the bean also assist in obtaining a tumbling action. Roasting occurs during a final microwave cavity stage in a preferred form of the invention in which stage the power level can be adjusted independently of that of the rest of the oven so as to precisely control the degree of roast desired. The beans emerge from the tube in a separate cooling section where air is used to cool the beans and to remove the volatiles from the system. In addition, water quenching can be added in this stage.

The tube itself is preferably cylindrical and is mounted on suitable supports for rotation. At the feed end of the system a suitable end load is employed to keep microwave leakage below acceptable limits. The tube itself is microwave transparent and may be made of glass, quartz, mullite, or other material capable of sustaining the temperature of operation.

In operation, the present invention is characterized in that the beans generally are in such a state of motion as to establish thermal equilibrium amongst them by continuous intermixing caused by the tumbling action, for, as they rise up the tube wall and exceed the angle of repose, they are dumped in a shower of other beans and are thereby thoroughly intermixed. In addition, each bean has an ample opportunity to interact with a variety of the microwave fields available within the tube and cavity. This occurs a plurality of times during transit through the tube and therefore averages the microwave thermal heating and provides the opportunity for direct bean-to-bean contact and thermal equilibrium to be established between the beans resulting in a high degree of bean temperature and roast uniformity.

BRIEF DESCRIPTION OF THE DRAWINGS

FIG. 1 is a schematic diagram of a continuous microwave system for roasting coffee constructed in accordance with the present invention.

FIG. 2 is a side elevational view with portions broken away of the microwave roasting portion of FIG. 1.

FIG. 3 is a set of graphs illustrating the various characteristics of the operation of the system of FIG. 1 and of the product as it undergoes roasting operation through the apparatus of FIG. 2.

DETAILED DESCRIPTION OF THE PREFERRED EMBODIMENT

Referring now particularly to the drawings, a preferred embodiment of the invention is shown which has been particularly adapted for the roasting of coffee. In general, coffee beans are introduced at the upper end as an input feed stream into the apparatus after the same has been suitably processed in a conventional manner for the removal of debris. No particular special blending of coffee or modification of the bean structure is necessary before being introduced into the apparatus of the present invention. As will be disclosed, the apparatus is capable of raising the coffee beans progressively to a roasting temperature and maintaining them at such a temperature for a sufficiently long time to develop the desired degree of roast.

GENERAL ARRANGEMENT

Referring now particularly to FIGS. 1 and 2, the apparatus for the microwave roasting of coffee bean in accordance with the present invention consists generally of a microwave oven 20 defining at least one microwave cavity therein, the entire assembly being supported on a suitable framework 22. The oven is provided with access doors, one of which is shown, and a vent window 28, as well as cavity vents 30, 32 and 34. The oven is defined by conductive walls 36, 38, 40 and 42, as well as bottom and top walls 44, 46. The inlet end wall mounts an end load frame which is canted at an upward angle for receiving the associated flange of an inlet end load 52 at that side, the latter being supported on a suitable framework 54 together with tube drive assembly 56. A material feed and support assembly 58 is positioned adjacent the inlet end and delivers coffee beans to the apparatus through drive assembly 56. The outlet end wall terminates preferably in a cooling chamber 60 communicating solely through a simple port formed in wall 42..

As shown, a closed cylindrical microwave transparent tube 90 is disposed through the oven at a pedetermined angle to the horizontal, which may be made adjustable by provision of suitable means such as a cavity framework jacking system. In some applications this may be required to accommodate differences in bean character between roasts.

Such tube may consist, for example, of heat resistant glass, such as Pyrex brand glassware, quartz, or mullite. The tube is preferably made of a unitary structure either of a piece or of joined pieces extending continuously through the oven from the upper end load down where the end passes a port 43 in wall 42 where it is supported for rotation on suitable trunion 62. Additional support structures and the means for aligning the tube are disclosed in detail in the aforementioned cross referenced application. The upper end load 52 is of the type disclosed in U.S. Pat. No. 3,983,356. As shown in FIG 1 the microwave oven or cavity is fed through suitable power transmission ports formed through the cavity walls construction which may be of the type disclosed in U.S. Pat No. 3,916,137. Each port is diagrammatically indicated as connected to a respective one of power supplies 64-1, 64-2, 64-3, 64-4 cooled in the usual manner by forced air. The 90 is preferably insulated along its length within the oven by wrapping the same with a suitable insulating material which is microwave transparent; one specific example being Cer-blanket (trademark) sold by Johns Manville Company. The remaining details of the inlet support, the attachment to the drive assembly and internal structure are disclosed together with other mechanical details of the construction of the device not otherwise given herein in the cross referenced application.

Coffee beans are fed by a suitable metering device such as a feed speed control 70 to the inlet opening of a hopper 72 and are fed into the tube by a conventional screw-feed mechanism the speed of which is controlled by feed speed motor 70. The speed of rotation of the tube is controlled by suitable tube speed motor 74 which is rotationally attached to a portion of the inlet end of the structure by cable or other flexible drive chain 76.

ROAST CONTROL CAVITY

As indicated in both FIGS. 1 and 2, the final stage of processing the beans passing downwardly through the tube consists of a separate cavity 200 which is defined by the aforementioned cavity walls together with an additional wall 202 or septum which is disposed to be mounted transversely between the top, bottom, front and back walls of the oven and in electrical conductive relation therewith. A passageway 204 is provided for the tube to extend therethrough. The specific and exact location of this septum defining the final cavity will depend upon the specific structure, horizontal tilt angle, speed rates and other factors which are designed into the apparatus. In the form of the apparatus set forth in the examples given herein, this was found to be approximately 1/5th of the distance from the terminal end of the oven. This is to be not unexpected since approximately 80% of the energy required in the roasting of coffee is believed devoted to driving out the moisture and raising its temperature to the incipience of roasting. If bean heating is considered on the basis of a model where the assumption that is made that it is approximately linear, the final 20% of the cavity space is a location where the roasting process can be controlled and completed. In fact, heating is not believed to be actually linear because the microwave absorptive properties are changing as drying is accomplished and roasting proceeds. Accordingly, the linear model is given in aid of understanding the present invention and the results are approximately correct in the specific embodiment shown and described herein. However, in modifications within the scope of this invention the power densities are adjustable so that a different model may be more applicable.

As shown in FIGS. 1 and 3, separate power supply 206 is provided for cavity 200 and is also provided with separate means 208 for adjusting its power output which means can be tied directly to means 210 for inspecting the output bean product, as for example, bean color, which feeds back information on the color of the roasted bean which is one of the more significant characteristics, the uniformity of which is desired to be maintained and which is one direct indication of the degree of roast.

The microwave oven as previously stated, terminates in wall 42 through an apperature 43 which permits passage of the tube 90 which then abruptly terminates within a cooling chamber 60. The cooling chamber is defined by conductive upper, side, rear and front walls (220, 222, 224, being shown), which together with wall 42 confine the microwave energy which is otherwise transmitted through port 43 and through the tube 90 itself. Inasmuch as immediate cooling of the roasted beans is desired it is impractical to provide any elongate end load. Further means is provided for confining microwave fields within the cooling chamber and consists of a perforated lower wall 226 having holes sufficiently small as to prevent significant leakage of microwave energy, but sufficient to admit cooling air as is described.

As shown in FIGS. 1 and 2, a vent also in the form of a microwave trap 230 is provided and may consist of suitable pipe-like structure having adequately small passages therein as, for example, 2-inch conductive passages grouped in a bundle so as to form an exit port and connected to a chaff separator 232 and thence to a means for establishing flow through the cooling chamber such as blower 234, the output of which is delivered to a suitable pollution removal means 236 before being exhaused to atmosphere. This system provides a primary air cooling system for contacting the beans immediately after they emerge from the roasting section 92 of the tube. The beans are then delivered to a hopper 240 which empties through similar microwave trap drain 25 consisting of a plurality or group of elongate conductive tubular construction of suitably small cross section as to reduce microwave leakage to an acceptable level. Additional cooling means can consist of a plurality of spray nozzles 242 mounted in side wall 222 and directed at the emerging beans. This sprays water on the beans which is immediately flashed off and drawn away together with the volatiles emitted from the roasting tube and the cooling air passing through the chamber 60. Subsequent to leaving the cooling chamber 60, the beans are then preferably passed to a conventional cooling stage 250 which may include further cooling spray treatment at 252 and forced air flow from 256 for a period of a few minutes so as to reduce the temperature further for conventional processing of roasted beans received at 260. The water spray from 252 and air from 256 are removed through a chaff separator 262, if necessary, before being exhausted.

SYSTEM OPERATION

It might be thought that in view of the general ease with which the coffee beans slide with respect to each other that it would be difficult to obtain an appropriate tumbling action in the device of the present invention and that the beans would tend merely to slide along the bottom as a group. However, when they first are heated in the tube and moisture content is forced to the outside of the bean by the absorption of water, the beans tend to become slightly stickier than otherwise, even to the extent that some beans will stick to the side of the tube. However, these stuck beans make only one rotation before they are forced loose by the general mass of beans. Furthermore, this action tends to assist in the general tumbling of the beans over each other rather than just slide along the bottom of the tube. In addition, as they reach the initiation of roasting, the natural oils within the beans are driven to the outside and again causes them to become somewhat stickier so that a rotation with the tube and tumbling action results with good bean-to-bean intermixing and continual thermal exchange with other beans so as to establish good thermal equilibrium among them. This is to be contrasted with conveyor belt type ovens where such relative motion among the beans would not take place. In addition, the tumbling action causes the beans to come into contact with successively rotating portions of the conveying tube which, at thermal equilibrium itself, has become heated to successively hotter temperatues along the tube by thermal exchange with the heated beans.

All of the foregoing considerations contribute to the success of this type of roasting. It should be pointed out that it is possible to provide an absolute ambient air interlock at the feed end of the apparatus although the feed mechanism itself virtually precludes significant entry of ambient air. Therefore, the volatiles driven from the beans form a nonoxidizing atmosphere during their entire period of being roasted, such volatiles together with the moisture being drawn off at the exit chamber 60. It is evident that roasting in accordance with the present invention facilitates such roasting in a nonoxidizing atmosphere if desired, thus providing a significant benefit of the present system.

EXAMPLES

1. The following example is based on a low volume microwave rotary tube apparatus operating at about 5 kW input power with a cavity and tube length of about 5 feet. The tube elevation was $\frac{3}{4}''$ at its input end at the cavity entrance. The tube rotation speed was set at 21.5 rpm with a sample input feed rate of 0.75 lbs. per minute. The sample was found to be 0.64 lbs. per minute. The coffee thus roasted was characterized as a mild roast. However, the color was uniform and approximated a good commercial type product. Cross section roast uniformity was excellent.

2. The apparatus was the same as in the previous example, however, the conditions were varied. The feed rate was increased to 1.15 lbs. per minute with a tube rotation of 30 rpm. Cavity input power was raised to 7 kW. Essentially the same uniform color and quality of the roasted bean product resulted, as well as excellent bean cross sectional roast uniformity.

FIG. 3 is a set of graphs which summarize the roasting process in accordance with the microwave roasting system of the present invention. Several variables of different character have been overlaid and plotted against an arbitrary absissa which can be considered either the length of travel through the roaster of the present invention or the incremental amount of input power delivered in appropriate units. This is conveniently set forth in units of 1 to 5 which may be taken as the effective length of the tube in the cavity or as the approximate incremental increase in delivered microwave power to a total of 5 kW, which also conforms to the examples given.

The various curves are labeled to indicate their significance. Thus, in the first portion of the travel of the beans through the tube the moisture content which is nominally about 11% is driven down to virtually zero at about unit $3\frac{1}{2}$. Meanwhile, the bean temperature proceeds upwardly and may even plateau significantly between 2 and 3 since the temperature cannot rise far above the boiling point of water during this period. Thereafter, the temperature rise decreases during an interim temperature period in which there is a minimum microwave absorbing materials. Once the beginning of roasting takes place at about 350°-375° F. the oils and other carbonaceous materials become significantly microwave absorbant and ultimately result in an exothermic condition in which the bean would spontaneously continue to roast. The line labeled BTU input is substantially lineal and represents the sum of the microwave energy available to the beans being processed as they pass through the tube. The line labeled BTU absorbed represents the microwave energy actually converted to heat in the bean as it passes the transition from predominantly water microwave absorption to absorption by other components. The line at 4 represents the septum and, as shown, the BTU input between 4 and 5 is adjustable as for example between the dotted line and something substantially less so as to control the actual roasting segment of the cycle in the final cavity. the yield and density figures beginning at 100% are diagramatically indicated, the yield being approximately 85% at the termination of roasting. As is known, a substantial expansion of coffee beans when roasted occurs at the end of the roasting process. This reduces the density accordingly, the amount of which have been given by way of example herein. The significance of the yield and density curves is mainly that they follow curves which are known to exist in coffee roasting in the utilization of other types of roasting apparatus indicating a satisfactory performance of the system of the present invention. In the measurements made in connection with the examples given, the roasting yield was found to be higher than usual for the reasons previously mentioned.

Thus, there has been provided a new and improved system for the roasting of coffee utilizing microwave energy which has many advantages over other systems amongst which are improved taste and aroma, uniformity of roasting as a function of cross section of the bean, and a lower roasting temperature. The lower roasting temperature results from the uniformity with which roasting can be accomplished, and the lack of high temperature heated gases or equipment surfaces. Prior roasting systems require heatng fluids or contact surfaces greatly in excess of 400° F. to achieve the roasted product whereas measurements utilizing microwave energy in the present system have indicated adequate roasting at a substantially lower temperature, even as low as 385° F. Roasting proceeds in a nonoxidizing atmosphere and without tar build up on roaster walls or presence of burner combustion gases which detract from the taste and aroma of the product. In addition, precise product temperature control and degree of roast can be achieved by feedback sytems based on color as previously described, or temperature, or on volatiles composition measurements. It is a further feature of the invention that microwave devices of the type described are adapted for modular construction which readily permits scale up or scale down to suit production requirements. Not the least advantage is the fact that the amounts of volatiles which have to be removed are considerably reduced for several reasons. First of all, the temperature of the roast is lower particularly at the surface which, in combination with the absence of combustion gases and formerly needed large quantities of recirculating air result in less smoke and tar and inasmuch as the effluent volume required to be processed is much smaller, permits use of more efficient and vastly reduced pollution equipment, both in size and cost. While the cost of electrical energy for microwave heating may be considered somewhat higher than that of natural gas or fuel, the efficiency of energy usage of a microwave system operating on electricity is expected to be more favorable since the heating is restricted to the product and the insulated rotary transport tube. The walls of the microwave cavity around it are not heated and therefore heat is not generated to be lost to ambient.

The quality of coffee that is processed may be improved, particularly lower grade Robustas. Since microwaves volatilize the moisture inside the beans during drying phase, it is believed that they steam distill certain unwanted volatile components of Robastas.

Many other modifications, features and advantages of the microwave coffee roasting system of the present invention will occur to those skilled in the art to which the roasting of coffee and microwave matters are concerned. For example, nothing precludes the combination of microwave roasting in combination with other processes. For example, it may well be found that microwave roasting in accordance with the present invention can be advantageously combined with preliminary hot air drying since the latter, short of the roasting process is not subject to many of the criticisms of hot air roasting. Accordingly, a combination of drying by a more conventional means and subsequently roasting in accordance with the present invention may be practical. While the tube shown is right circularly cylindrical, the expression—cylindrical—should be understood to be used in its broadest sense, i.e., a line moving in space parallel to itelf about a closed loop. Thus, the cross section of the tube may be eliptical, polygonal or even square.

Thus, the scope of the present invention should not be taken as limited by the specific disclosure of the system made herein but should be taken in the light of the significant progress and contribution the invention makes to the art of roasting coffee.

What is claimed is:

1. In apparatus for roasting coffee beans, a microwave oven having a cavity including first incoming cavity portion in which the beans are heated and the moisture driven off and further heated to an initial roasting temperature, means forming a second final cavity portion in which the beans are roasted to a final predetermined degree of roast, separate means for supplying microwave power to said first and second cavity portions, means forming a cylindrical tube transparent to microwave energy disposed in said cavity at an angle to the horizontal angle therein, means for supporting and rotating said tube within said cavity, means for delivering coffee beans to the upper end of said tube, means for controlling the microwave power to said cavity portions to obtain a predetermined degree of roast, means forming a roasted bean receiving chamber at the lower end of said tube in which microwave power is not applied and which traps microwave energy which leaks through said tube, means for removing roasted beans from said chamber, means for immediately cooling beans within said bean receiving chamber as they emerge from the lower end of said tube, and means for removing the roast off-gases from said chamber.

2. An apparatus as in claim 1 in which the means forming a chamber receiving and initially cooling the beans is conductively isolated from the microwave oven except for the passage therein of the lower portion of the tube, said chamber being formed of conductive material, a microwave trap for permitting roasted beans to be recovered from said chamber.

3. An apparatus as in claim 1 further including a second means for receiving the beans from the cooling chamber for final cooling and for further processing.

4. An apparatus as in claim 1 further including means for controlling tube rotation speed, and means for controlling the feed rate of beans delivered to the upper end of the tube.

5. An apparatus as in claim 1 further including means for measuring a physical or chemical characteristic of the roasted beans, means for controlling the power level to be responsive to said measuring means.

6. An apparatus as in claim 3 in which the means for cooling the beans in the bean receiving chamber comprises means for directing a water cooling spray on the roasted beans as they emerge from the lower end of the tube.

7. An apparatus as in claim 1 in which means are provided in association with the chamber for establishing a cooling air stream for rapidly reducing the temperature of the beans to below roast temperature.

* * * * *